Aug. 28, 1956   M. C. CHENEY ET AL   2,760,229
APPARATUS FOR APPLYING PLASTIC COATING TO WIRE
Filed Sept. 20, 1952   3 Sheets-Sheet 3
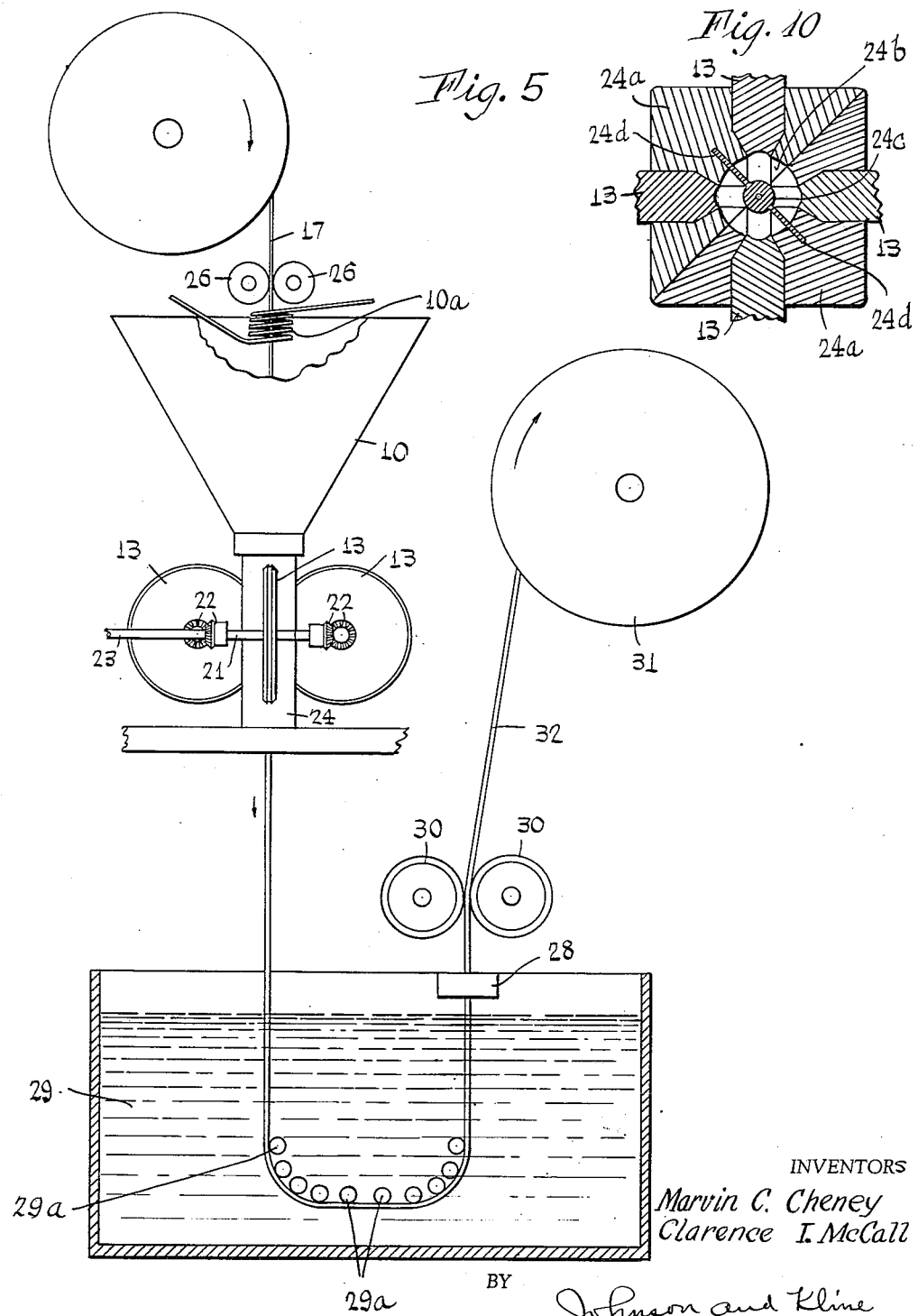

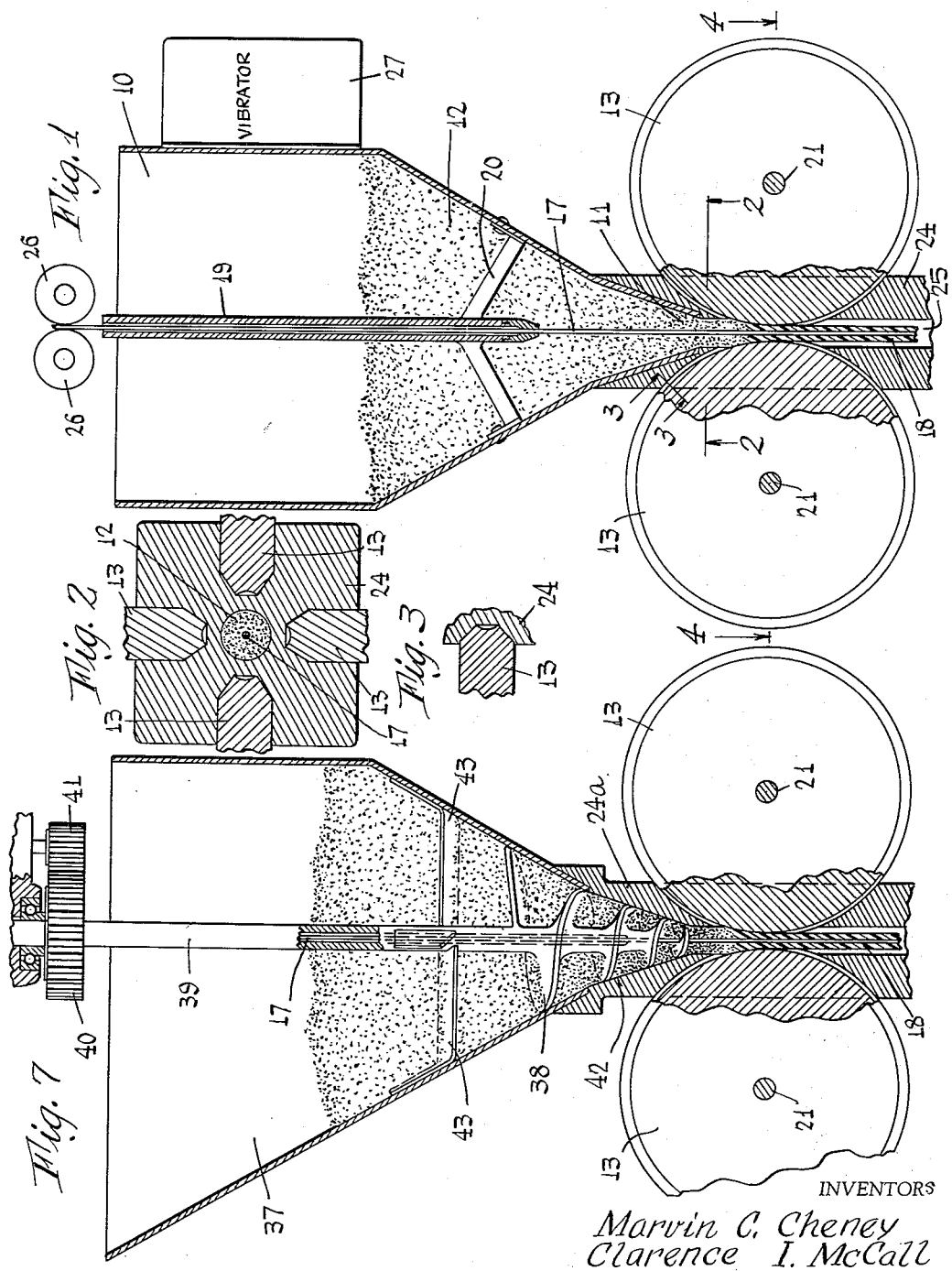

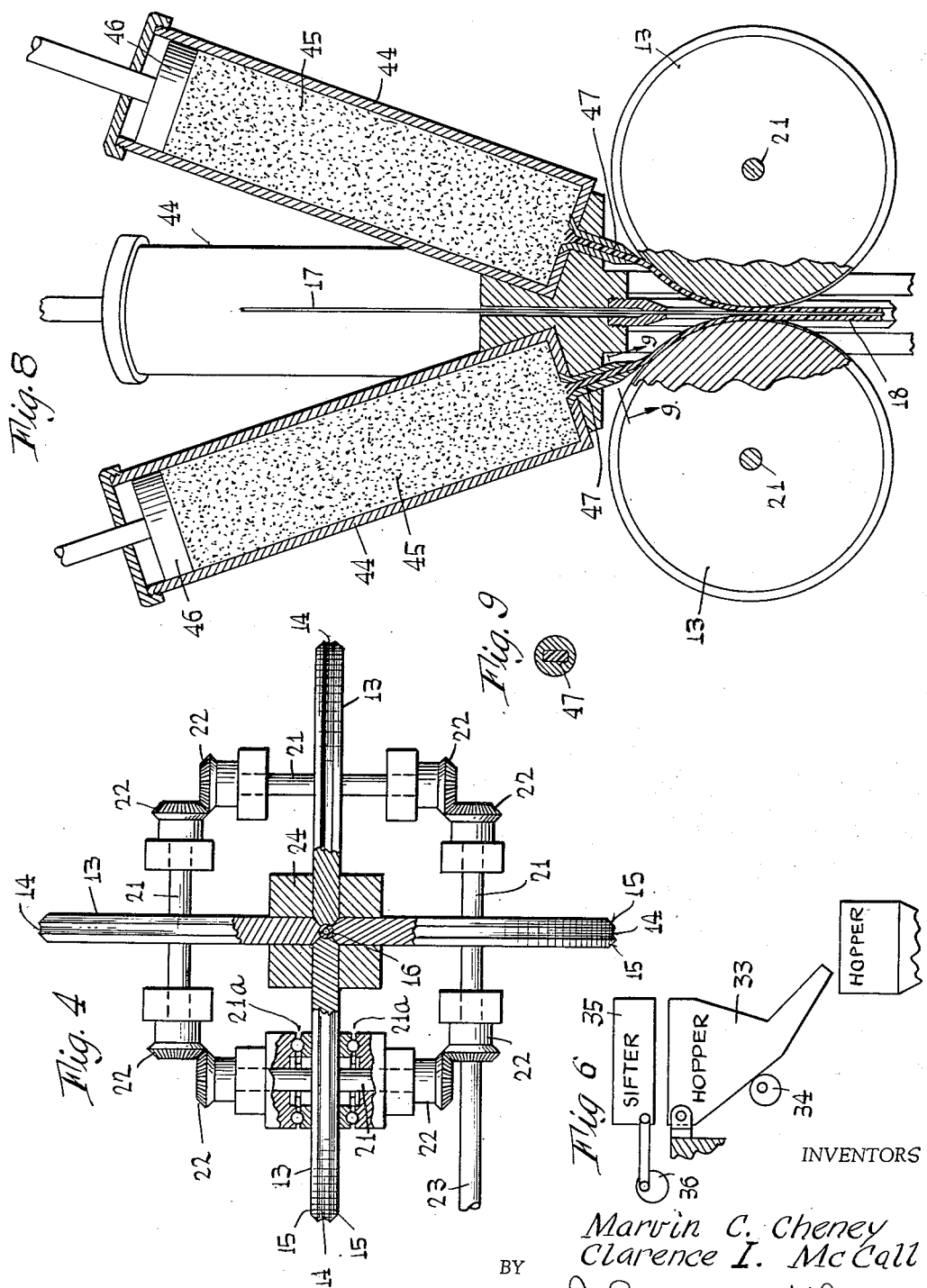

United States Patent Office 2,760,229
Patented Aug. 28, 1956

1

2,760,229

APPARATUS FOR APPLYING PLASTIC COATING TO WIRE

Marvin C. Cheney, Hamden, and Clarence I. McCall, Waterbury, Conn., assignors to The Lewis Engineering Company, Naugatuck, Conn., a corporation of Connecticut Application September 20, 1952, Serial No. 310,706

11 Claims. (Cl. 18—13)

This invention relates to the coating of wire with insulation, and more particularly to an apparatus for coating a wire with insulation of tetrafluorethylene or plastic of the same class.

While the invention is illustrated and described in connection with tetrafluorethylene plastic insulation it is not limited thereto, since it has utility when used with other types of materials. However, it possesses special advantage where the insulation is of the class of tetrafluorethylene.

Heretofore, because of the characteristics of tetrafluorethylene insulation (known to the trade by the registered trademark "Teflon"), particularly as regards its dimensional stability under high heat, it has been difficult if not impossible to satisfactorily extrude it through an extrusion die as a covering of insulation on electrical wire.

As a consequence, the insulating of wire with "Teflon" was effected by spiral-wrapping the wire with thin "Teflon" ribbon, the turns of which overlapped. For some uses this was satisfactory, but where the requirements demanded an unbroken, smooth covering of high breakdown strength, obviously the winding procedure was inadequate.

The above difficulties and disadvantages have been overcome by the present invention, and an object of the invention is to provide an improved apparatus for coating a wire or conductor with a smooth uniform homogeneous imperforate covering of plastic insulation, particularly insulation of "Teflon."

A further object of the invention is to provide an improved apparatus as above, by which the wire may be continuously coated with the "Teflon."

Another object of the invention is to provide an improved apparatus as above set forth which is simple and economical in use, is effective and reliable and capable of relatively high production.

Still another object of the invention is to provide simple, effective die means for use in an apparatus for continuously applying tetrafluorethylene insulation to wire to form an unbroken covering thereon.

A still further object of the invention is to provide, in such an apparatus, an improved hopper or supply means for holding discrete particles of tetrafluorethylene or other fluorocarbon plastic insulation and for feeding said insulation particles simultaneously with the wire to said die means.

In accomplishing the above objects we provide novel hopper means for feeding discrete particles of the insulation to a forming point in the apparatus where the insulation particles are formed about the wire as a compacted covering. At this forming point we provide novel die means comprising rollers disposed about a point, said rollers having annular grooves in their peripheries and having annular portions on both sides of the grooves

2 which are engageable and cooperable with each other to provide a confined space whose walls are formed by the peripheries of the rollers. The rollers are turned so that the juxtaposed peripheral portions all move generally in the same directions simultaneously and at equal peripheral speeds, and the wire and insulation particles are passed between the rollers and through the said confined space. Means are also provided, confining adjacent peripheral portions of the rollers at the forming point, to confine the insulation particles and lead the same to the confined space formed by the rollers.

We also provide in combination with the above a sintering bath having a nitrite and nitrate salt solution, through which the coated wire is passed after leaving the die rollers, thereby to merge the insulation particles with each other and form an imperforate covering about the wire.

Where stranded wire is to be coated it may be desirable to preheat the wire prior to the coating and sintering operations, and accordingly we provide means for effecting such heating as the wire is continuously fed to the rollers. Such preheating prevents or minimizes expansion of the air inside of the coating of insulation while the coated wire is passing through the sintering bath, and eliminates the likelihood of a rupture of the coating occurring.

The apparatus of this invention are especially advantageous in connection with wires or conductors of one-quarter inch diameter or larger, although they also have distinct utility with smaller diameter wires.

Other features and advantages will hereinafter appear.

In the accompanying drawings:

Figure 1 is a vertical sectional view of a portion of an apparatus for insulating a wire with "Teflon" as provided by the invention, minor parts of the apparatus being shown in elevation.

Fig. 2 is a fragmentary horizontal section taken on line 2—2 of Fig. 1.

Fig. 3 is a fragmentary section taken on line 3—3 of Fig. 1.

Fig. 4 is a view partly in horizontal section and partly in plan, the section being taken on line 4—4 of Fig. 1.

Fig. 5 is a schematic diagram showing the structure of Fig. 1 incorporated in an apparatus wherein bare wire is being completely coated and insulated with "Teflon," in accordance with the invention.

Fig. 6 is a fragmentary schematic diagram showing other parts of the apparatus in elevation.

Fig. 7 is a view partly in elevation and partly in vertical section on an apparatus illustrating a modification of the invention.

Fig. 8 is a view partly in vertical section and partly in elevation showing an apparatus for coating wire with "Teflon," according to a modification of the invention.

Fig. 9 is a fragmentary section taken on line 9—9 of Fig. 8.

Fig. 10 is a horizontal sectional view like Fig. 2, but showing a modification of the invention.

Referring to Figs. 1 through 5 there is shown a hopper 10 having a reduced throat or discharge orifice 11, said hopper containing a quantity of "Teflon" 12 in the form of discrete granules or particles.

In accordance with the invention there is provided immediately adjacent and below the discharge orifice 11 of the hopper 10 novel and improved means for compacting and forming the "Teflon" particles about a wire to provide a substantially solid or homogeneous covering. This means comprises a plurality of pressure rollers 13, four being shown in the drawing, disposed about a point and having annular grooves 14 in their peripheries, and annular portions 15 on both sides of said grooves, said portions 15 being shown as inclining 45° with respect to the axes of the rollers and being engageable and cooperable to provide between them and in the plane containing their axes a confined space for the passage of the wire and the insulative coating.

Referring to Fig. 4 it will be seen that the peripheral portions 15 of the rollers 13 contact along radial lines originating a a circular confined space 16 through which a wire 17 passes, as does also the compacted and formed insulation in the form of a tubular jacket 18. It will be noted from Fig. 1 that the wire 10 passes through a tubular guide 19 in the hopper 10, said guide being supported by radial arms 20 secured to the conical side walls of the hopper.

The rollers 13 are carried on shafts 21 provided with meshing bevel gears 22 by means of which all of the rollers are turned simultaneously and have equal peripheral speeds. One of the shafts 21 has an extension 23 to which driving force may be applied.

As shown in Fig. 4, antifriction thrust bearings 21a may be provided for engagement with the side surfaces of the rollers 13 to accurately position the latter with a minimum of friction.

Referring to Figs. 1, 2 and 4, guide means 24 are provided at the adjacent peripheral portions of the rollers 13, confining said peripheral portions at their points of contact. The guide means 24 may constitute a single block of material, or it may be composed of separate pieces, and has four arcuate cutout portions receiving the adjacent peripheral portions of the rollers, and also has a bore 25 communicating with the enclosed space 16 formed by engagement of the rollers.

Preferably the guide means 24 extends both above and below the rollers 13 as shown in Fig. 1, the upper portion of the guide means having a conical bore to receive, support and position the mouth or orifice of the hopper 10. The guide means thus provides a channel for the particles of "Teflon" and guides the said particles to the space between the rollers where the particles are compacted and formed into the tubular coating.

The action of the rollers 13 is such as to continuously draw on the supply of "Teflon" particles 12, facilitating the feeding of said particles to the enclosed space 16. During such action the "Teflon" particles are compacted and formed into a dense tubular coating or covering about the wire 17. Because of the cohesion between the "Teflon" particles they will adhere and retain the tubular shape given by the rollers 13 as they leave the vicinity of the rollers together with the wire 17.

It will be understood that suitable means is provided to feed the wire 17 at a closely controlled rate through the guide 19 and between the rollers 13. Such feed may, for example, comprise opposed rollers 26 or other suitable means.

Preferably the hopper 10 is provided with means for agitating it, such as a vibrator 27, thereby to prevent bridging over of the "Teflon" particles 12 and to facilitate the feeding of the particles into the throat and out of the discharge orifice 11 of the hopper. After the assembly of wire 17 and coating 18 thereof leaves the rollers 13, Fig. 5, it may pass into a sintering bath 29 and be withdrawn by feed rollers 30 and fed to a reel 31. The sintering bath 29 is at the proper temperature to cause the coating 18 on the wire to be formed into a continuous homogeneous mass devoid of wrinkles, cracks, or any ruptures whatsoever, and accordingly the wire, as indicated at 32, which leaves the sintering bath 29 will be completed insofar as its insulation with the "Teflon" is concerned.

If desired the wire 32 may be passed through a burnishing die 28 after leaving the sintering bath 29 and prior to being engaged by the feed rollers 30, to remove or smooth out any irregularities which might be present on the surface of the coating.

The sintering bath 29 may advantageously consist of a solution of nitrite and nitrate salts, melting at temperatures as low as 325° F. and being capable of temperatures up to 800° F.

In the sintering bath 29 rolls 29a are shown to guide the wire, and said rolls may advantageously be formed of polished or glazed ceramic composition.

Referring to Fig. 5 an induction heating means 10a may be provided in or above the hopper 10, to preheat the wire 17 after it leaves the feed rollers 26. This is advantageous if the wire is of stranded construction, since it causes an expansion of the air occupying the interstices of the wire and prevents such expansion from occurring during the sintering of the insulation covering of the wire. If air within the coating were to expand during the sintering operation it might have an undesirable consequence, such as rupture of the coating.

In Fig. 10 a modified form of guide means 24a is shown, having a conical or tapered space 24b surrounding the wire immediately above the point of contact of the rollers 13 and below the orifice of the hopper 10. Such enlarged area or space has the effect of facilitating the feed of the granules 12 to the rollers 13. It will be understood that the section shown in Fig. 10 is taken at a point corresponding to the section lines 2—2 in Fig. 1.

The guide means 24a may be made of two identical halves, as shown, and may carry a die 24c mounted on arms 24d, said die being closely adjacent the contacting portions of the rollers and centralizing the wire in the confined area provided by the rollers.

Thus, according to the invention, there has been provided a simple, novel and improved apparatus whereby "Teflon" particles may be compacted and formed into a solid covering about an electrical wire. The apparatus is characterized by relatively few moving parts, is reliable and foolproof and operates to satisfactorily cover the wire 17 with an unbroken covering of "Teflon" which will withstand high breakdown tests.

If desired the hopper 10 may be supplied with the "Teflon" particles, see Fig. 6, from a second hopper 33 agitated by an eccentric 34 and receiving the "Teflon" from a sifter 35 agitated by a crank 36.

In accordance with the invention, referring to Fig. 7, "Teflon" particles may be fed to the rollers 13 from a hopper 37 having a spiral screw feed 38 disposed in its throat, said screw being driven by a hollow shaft 39 and gears 40 and 41. The screw 38 is hollow, and accordingly the wire 17 may be passed through the shaft 39 and the screw 38 so as to emerge from the orifice of the hopper with the particles of "Teflon."

Preferably guide means 24b are provided, having a conical bore 42 closely fitting the edge portions or crests of the screw 38 and providing a bearing therefor. In this connection it will be noted that a characteristic of "Teflon" plastic is its slippery feeling and this characteristic is made use of by the provision of the screw 38 which readily feeds the "Teflon" particles, aided by gravity, to the space between the pressure rollers 13.

Agitating arms 43 may be provided on the shaft 39 to further agitate the "Teflon" and prevent bridging thereof in the space above the screw 38.

Another embodiment of the invention is illustrated in Fig. 8, wherein a plurality of cylinders 44 is provided having charges 45 of "Teflon" particles. The cylinders 44 have plungers or pistons 46 by which the "Teflon" may be forced from orifices 47 at the lower ends of the cylinders, in the form of ribbons. The ribbons are fed to peripheral portions of the rollers 13, and are compacted and formed about the wire 17 by the rollers, into a continuous coating 18.

When the charges 45 in the cylinders 44 are exhausted the apparatus is halted and the cylinders refilled, whereupon the coating procedure may be continued.

If desired the cylinders 44 may be operated in pairs alternating with each other, thereby to provide for continuous operation of the apparatus. In such event the two ribbons 47 which leave two opposite cylinders 44 will be formed by the four rollers 13 into a complete covering about the wire 17. As one pair of cylinders 44 approaches the discharged condition the other pair may be brought into operation and the first pair refilled. Thereafter the second pair may be refilled, etc.

In each of the embodiments of the invention described above there is employed the step of continuously moving the wire longitudinally, surrounding successive portions of the wire with separate pieces of "Teflon," and compressing and compacting the resultant mass to form a substantially solid coating of "Teflon" about the wire.

The apparatus described is characterized by simplicity, ease of construction, compactness and ease of operation together with high productive capacity.

Variations and modifications may be made within the scope of the claims and portions of the improvements may be used without others.

We claim:

1. Means for forming and compacting under pressure cohesive particles of insulation into a substantially solid covering about a wire, comprising a plurality of narrow rollers in excess of two disposed about a single point, having annular grooves in their peripheries and having annular coengaging portions on both sides of said grooves, said rollers having oppositely-disposed sides and engaging and cooperating with each other to provide, between the rollers and in the plane containing their axes, a confined space having walls constituted of peripheral portions of the rollers for the passage of the wire and insulation; means for turning the rollers to cause said peripheral portions to travel substantially in the same directions at said confined space and at equal peripheral speeds to provide for continuous unidirectional movement of the said walls bounding said confined space; and means providing an enclosure, extending alongside and closely adjacent the oppositely disposed sides of the rollers, said means closely confining said sides and having a passage through which the wire and insulation passes.

2. Means for forming and compacting under pressure cohesive particles of insulation into a substantially solid covering about a wire, comprising a plurality of rollers in excess of two disposed about a single point, having annular grooves in their peripheries and having annular coengaging portions on both sides of said grooves, said rollers engaging and cooperating with each other to provide, between the rollers and in the plane containing their axes, a confined space having walls constituted of peripheral portions of the rollers for the passage of the wire and insulation; means for turning the rollers to cause said peripheral portions to travel substantially in the same directions at said confined space and at equal peripheral speeds to provide for continuous unidirectional movement of the said walls bounding said confined space; and means extending alongside and closely adjacent the sides of the said annular portions, closely confining said portions, said means having a passage for said wire and insulation, said means confining the adjacent annular portions of the rollers and providing the passage for the wire and insulation extending an appreciable distance in opposite directions from the confined space formed by the rollers.

3. The invention as defined in claim 1 in which there are two sets of opposed rollers disposed about the said point, and in which the annular portions of the rollers incline forty-five degrees with respect to the axes of the rollers and extend to the said grooves.

4. The invention as defined in claim 1 in which there is means adjacent the said confined space and within the passage of said confining means, guiding the wire and centralizing the same in said space.

5. In an apparatus for coating insulation on wire, an upright hopper for holding a quantity of discrete particles of insulation, said hopper having a discharge orifice at its bottom; means for passing a wire to be coated downward through the hopper and out of the orifice thereof; narrow rollers disposed about the said orifice, having annular grooves in their peripheries and having annular portions on both sides of said grooves, said portions being engageable and cooperable to provide, between the rollers and in the plane containing their axes, a confined space adjacent the orifice having walls constituted of peripheral portions of the rollers for the passage of said wire and particles of insulation, said rollers having oppositely-disposed sides; means for turning the rollers so that the engaging portions all travel in the same directions and at equal peripheral speeds to provide for continuous unidirectional movement of the said walls bounding said confined space, thereby to advance the insulation with the wire and compact the insulation thereon into a substantially solid covering; and means extending from the orifice of the hopper and alongside and closely adjacent the oppositely disposed sides of the rollers, providing a closed passage from the hopper to said confined space, for the said wire and insulation.

6. In an apparatus for coating insulation on wire, a container means for holding a quantity of said insulation, having an orifice for discharging the same at a predetermined rate and in a predetermined location; narrow rollers disposed about the said location, having annular grooves in their peripheries and having annular portions on both sides of said grooves, said portions being engageable and cooperable to provide, between the rollers and in the plane containing their axes, a confined space adjacent the said location having walls constituted of peripheral portions of the rollers for the passage of said wire and insulation, said rollers having oppositely-disposed sides; means for turning the rollers so that the engaging portions all travel in the same directions and at equal peripheral speeds to provide for continuous unidirectional movement of the said walls bounding said confined space, thereby to advance the insulation with the wire and compact the insulation thereon into a substantially solid covering; and means extending from the orifice of the container means and alongside and closely adjacent the oppositely disposed sides of the rollers, providing a closed passage from the hopper to said confined space, for the said wire and insulation.

7. The invention as defined in claim 6 in which there are two sets of opposed rollers disposed about said predetermined location, and in which the annular portions of the rollers incline forty-five degrees with respect to their axes and extend to the said grooves, said annular portions engaging at four zones to provide said confined space.

8. The invention as defined in claim 6 in which the means providing the closed passage engages and positions the means for holding the quantity of insulation.

9. The invention as defined in claim 5 in which the hopper has a conical portion adjacent its orifice and in which there is a conical screw in said conical portion and in the means providing the closed passage, for feeding the particles of insulation through the discharge orifice.

10. The invention as defined in claim 9 in which the means providing the closed passage has a bearing surface engaging the screw to position and support the latter for rotation.

11. The invention as defined in claim 1 in which the said passage for the wire and insulation is substantially conical at the entrance side of the rollers.

(References on following page)

References Cited in the file of this patent

UNITED STATES PATENTS

| | | |
|---|---|---|
| 325,363 | Royle et al. | Sept. 1, 1885 |
| 1,374,584 | Knecht | Apr. 12, 1921 |
| 1,440,007 | Freeman et al. | Dec. 26, 1922 |
| 1,956,575 | Hinsky | May 1, 1934 |
| 1,985,997 | Keeran | Jan. 1, 1935 |
| 2,069,087 | Forstrum et al. | Jan. 26, 1937 |
| 2,101,561 | Rapp | Dec. 7, 1937 |
| 2,291,670 | Wiley et al. | Aug. 4, 1942 |
| 2,382,177 | Schanz | Aug. 14, 1945 |
| 2,456,262 | Fields | Dec. 14, 1948 |
| 2,456,621 | Cheney | Dec. 21, 1948 |
| 2,485,691 | Bogese | Oct. 25, 1949 |
| 2,669,754 | Chadbourne | Feb. 23, 1954 |

FOREIGN PATENTS

| | | |
|---|---|---|
| 261,700 | Great Britain | Mar. 31, 1927 |